(12) United States Patent
Igarashi et al.

(10) Patent No.: US 9,547,297 B2
(45) Date of Patent: Jan. 17, 2017

(54) FIELD DEVICE AND FIELD DEVICE SOFTWARE UPDATE SYSTEM THEREWITH

(75) Inventors: Syouji Igarashi, Musashino (JP); Kazuhiro Hashizumi, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 2094 days.

(21) Appl. No.: 12/615,461

(22) Filed: Nov. 10, 2009

(65) Prior Publication Data
US 2010/0122245 A1  May 13, 2010

(30) Foreign Application Priority Data
Nov. 11, 2008 (JP) .................... 2008-288524

(51) Int. Cl.
G06F 9/44 (2006.01)
G05B 19/042 (2006.01)
G06F 12/12 (2016.01)
G06F 9/50 (2006.01)
G06F 12/08 (2016.01)
G06F 9/445 (2006.01)

(52) U.S. Cl.
CPC ............ *G05B 19/0426* (2013.01); *G06F 8/65* (2013.01); *G06F 9/5016* (2013.01); *G06F 12/08* (2013.01); *G06F 12/0871* (2013.01); *G06F 12/12* (2013.01); *G06F 12/122* (2013.01); *G05B 2219/23335* (2013.01)

(58) Field of Classification Search
CPC .... G06F 9/5016; G06F 12/0871; G06F 12/08; G06F 12/12; G06F 12/122
USPC .......................................................... 717/170
See application file for complete search history.

(56) References Cited

U.S. PATENT DOCUMENTS

| | | | | |
|---|---|---|---|---|
| 5,555,410 | A * | 9/1996 | Tsuchiya | 717/101 |
| 6,701,284 | B1 * | 3/2004 | Huntley et al. | 702/187 |
| 2005/0137719 | A1 * | 6/2005 | Saito et al. | 700/5 |
| 2005/0165760 | A1 * | 7/2005 | Seo | 707/3 |
| 2007/0220506 | A1 * | 9/2007 | Maruyama | 717/168 |

FOREIGN PATENT DOCUMENTS

| | | |
|---|---|---|
| JP | 2005-99989 A | 4/2005 |
| JP | 2005-173747 A | 6/2005 |
| JP | 2008-205075 A | 9/2008 |

OTHER PUBLICATIONS

Office Action, dated Nov. 12, 2012, issued by the Japanese Patent Office in counterpart Japanese Patent Application No. 2008-288524.

* cited by examiner

*Primary Examiner* — Henry Tsai
*Assistant Examiner* — John Roche
(74) *Attorney, Agent, or Firm* — Sughrue Mion, PLLC

(57) ABSTRACT

There is provided a field device for downloading a new software through a field bus from a host system and replacing a current software which is currently executed with the new software. The field device includes: a history information generation and management section which generates and stores history information of the current software when the new software is downloaded from the host system.

11 Claims, 11 Drawing Sheets

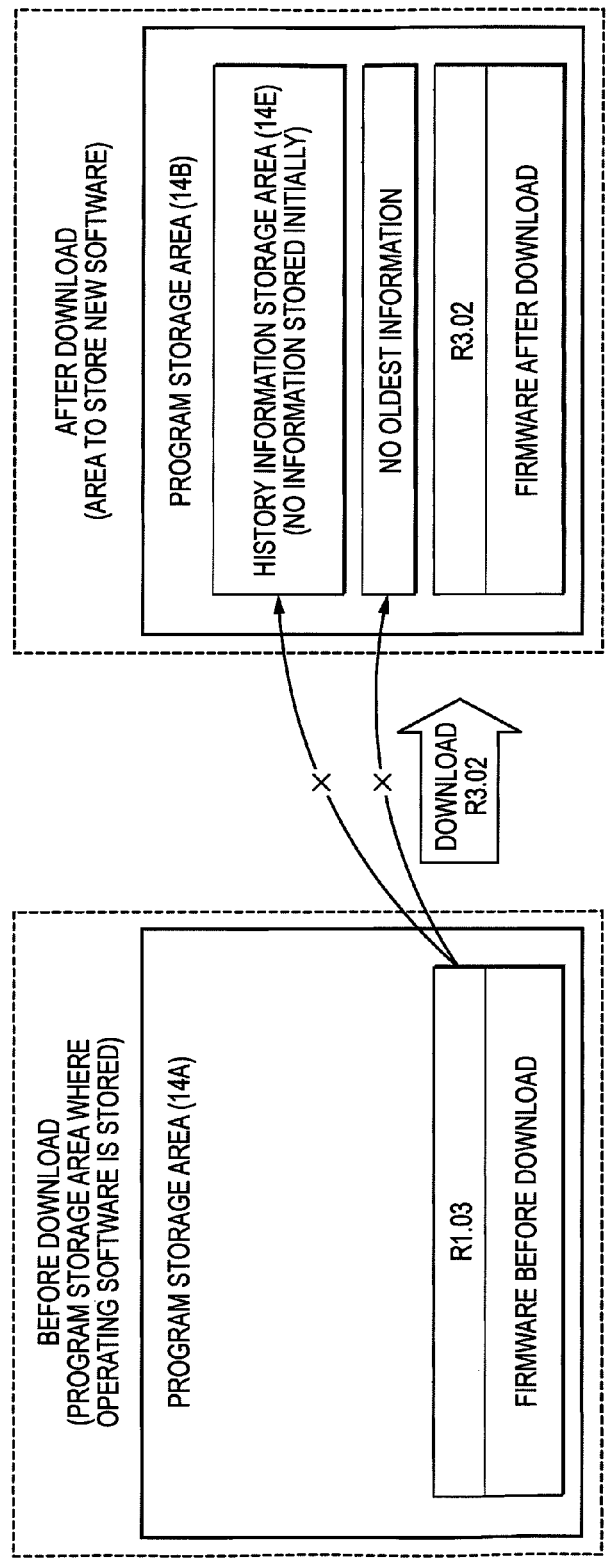

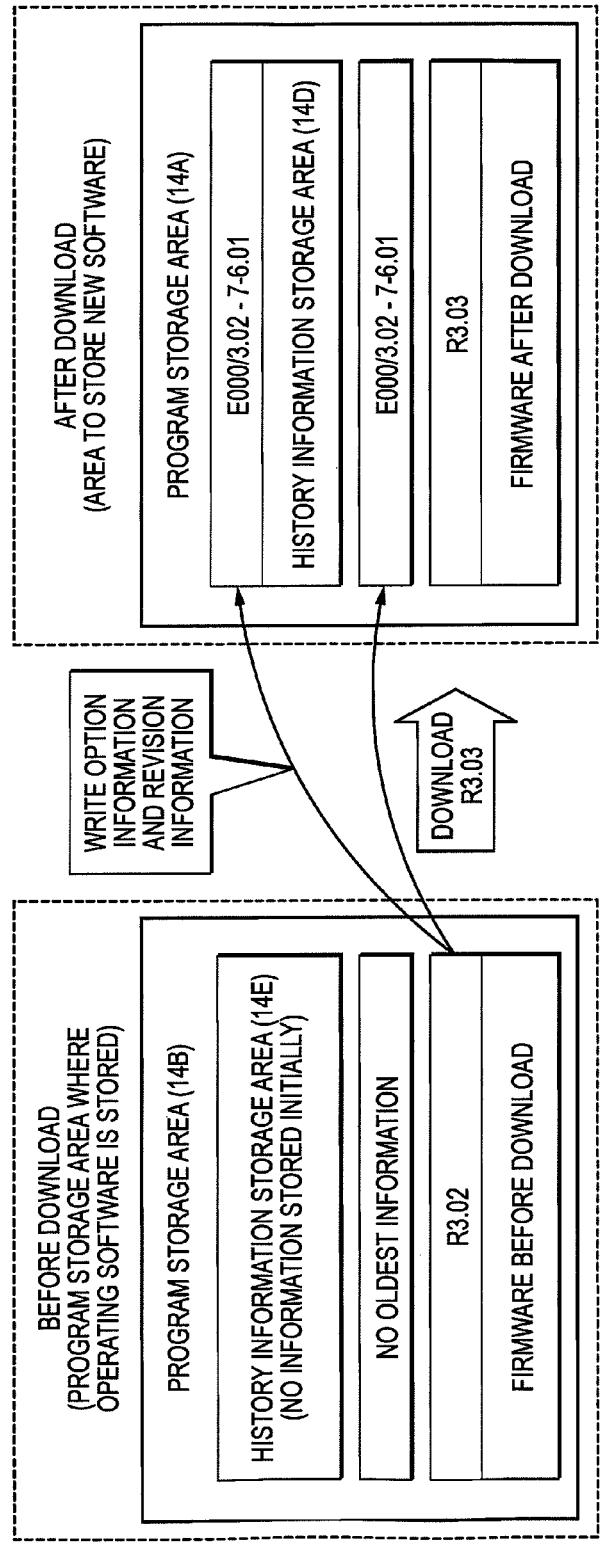

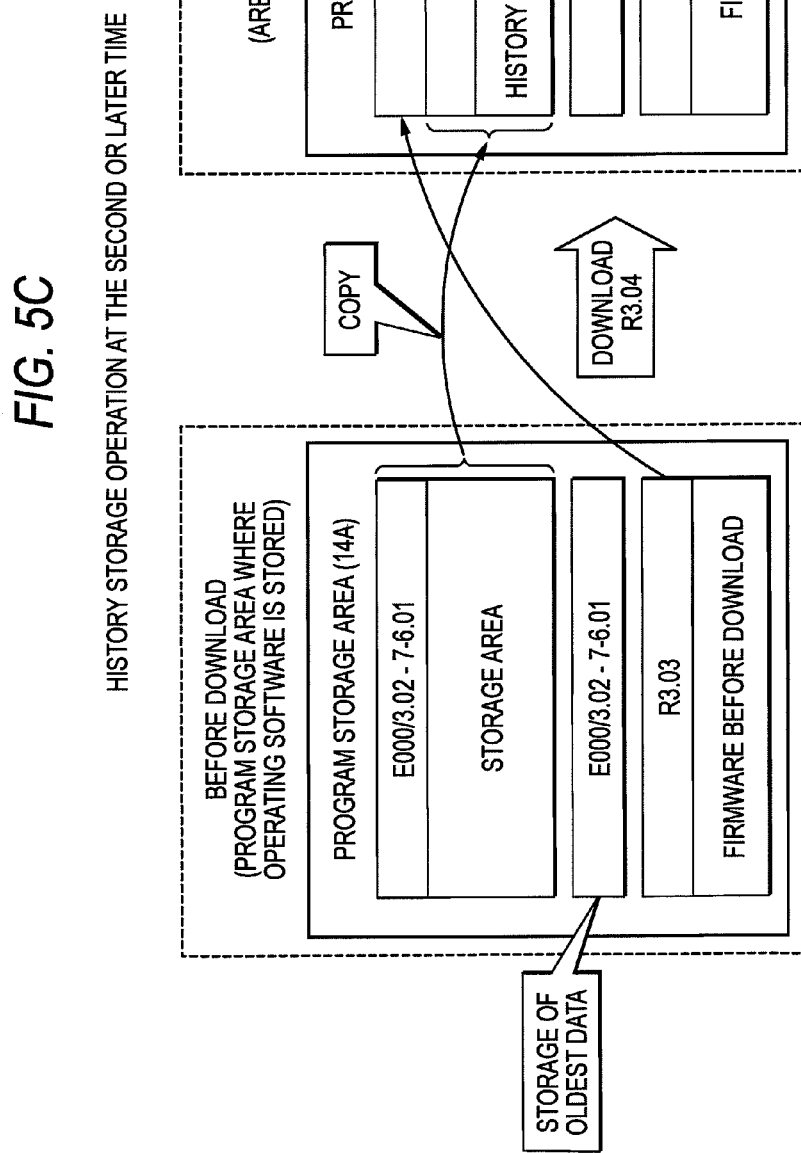

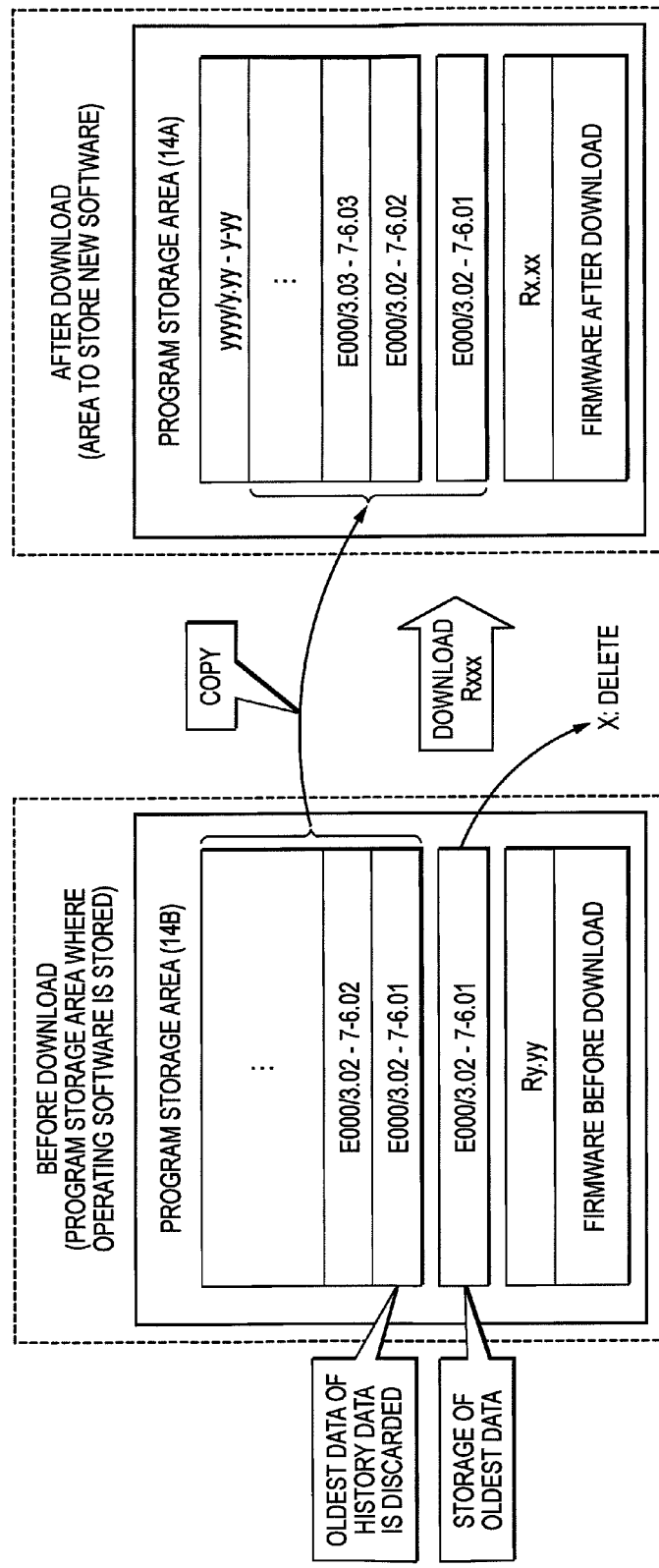

FIG. 6A

| PARAMETER NAME | DESCRIPTION |
| --- | --- |
| SOFTDL_HIST_FIRST_VERSION | PARAMETER TO ACQUIRE THE OLDEST INFORMATION OF THE VERSION OF THE SOFTWARE, ETC., INSTALLED AT THE SHIPMENT TIME OF THE FIELD DEVICE. |

FIG. 6B

| PARAMETER NAME | DESCRIPTION |
| --- | --- |
| SOFTDL_HIST_DATA | PARAMETER FOR REQUESTING INFORMATION TO DISPLAY SOFTWARE DOWNLOAD HISTORY INFORMATION. THE USER CAN ACQUIRE SOFTWARE DOWNLOAD HISTORY INFORMATION OF THE FIELD DEVICE BY READING THE PARAMETER. |

FIELD DEVICE AND FIELD DEVICE SOFTWARE UPDATE SYSTEM THEREWITH

This application claims priority from Japanese Patent Application No. 2008-288524, filed on Nov. 11, 2008, the entire contents of which are incorporated by reference herein.

BACKGROUND OF THE INVENTION

1. Technical Field

The present disclosure relates to a field device whose software is replaced through a field bus and a field device software update system using the field device and, more particularly, relates to implementation of history information management of software.

2. Related Art

In recent years, in order to improve function distribution intended for process improvement, in a process control system of industrial automation, an additional function such as expansion of a self-diagnosis function has also been demanded for a field device including a sensor (e.g., a flowmeter or a thermometer), an actuator, and a controller making up a control loop of feedback control. Since a conventional field device has rich functions and thus a bug is likely to occur, software or firmware installed in the field device is replaced (updated) using the communication function of a field bus (see e.g., JP-A-2005-173747).

FIG. 7 is a block diagram to show a configuration example of a field device and a process control system using the field device in a related art. In FIG. 7, a field device 1 incorporating an analog input function block AI and a PID function block PID is connected to a field bus 2 for FOUNDATION Fieldbus (registered trademark), serial transmission or the like. Plural field devices (not shown) are connected to the field bus 2.

The field device 1 is made up of a sensor 11 for measuring a process amount, a communication section 12 for conducting data communications with a different field device or any other device through the field bus 2, a computation control section 13 for controlling the functions of the field device 1 and replacing software or firmware, and a storage section 14 having program storage areas 14A and 14B for storing software, firmware or a program of a computation portion for converting a measurement signal from the sensor into an output signal.

Software of the field device 1 can be replaced with new software to upgrade the function of the existing software or solve a problem.

Any other field device (not shown) is connected to the field bus 2 and a host 3 is connected to the field bus 2 through an I/O unit and a bus (not shown). The host 3 is a host system of DCS, including software transfer means for downloading or transferring software to a field device.

In the configuration, the field device 1 receives data of new software from the host 3 through the field bus 2 and stores the received new software in the storage area 14B where operating software is not stored.

After the data is downloaded, the field device 1 is restarted and operates the new software stored in the storage area 14B. This means that the operating software is rewritten in the field device 1.

Thus, in the related-art field device, the software or firmware installed in the field device can be replaced using the communication function of the field bus.

However, in the related-art field device, history information as to what revision the software which previously operated has undergone cannot be known although software can be replaced.

Also, in the related-art field device, the revision of the software which previously operated cannot be grasped and thus it is hard to restore the operation of the field device to the operation of the previous revision software if a defect occurs.

Further, in the related-art field device, the revision of the software which previously operated cannot be grasped and thus the circumstances and the progress of a plurality of software products installed so far are not known and the defects of the software which occurred in the past cannot be investigated.

Further, in the related-art field device, the revision of the software which previously operated cannot be grasped and thus if a defect occurs, it is not easy to restore the operation of the field device to the operation of the previous revision software. Accordingly, it takes time in maintenance of the software, and the whole process control system is affected.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an illustrative aspect of the present invention to provide a field device in which history information of software which previously operated can be grasped in replacing the software of the field device and a field device software update system using the field device.

According to one or more aspects of the present invention, there is provided a field device for downloading a new software through a field bus from a host system and replacing a current software which is currently executed with the new software. The field device comprises: a history information generation and management section which generates and stores history information of the current software when the new software is downloaded from the host system.

According to one or more aspects of the present invention, there is provided a field device for downloading a new software through a field bus from a host system and replacing a current software which is currently executed with the new software. The field device comprises: a storage section including two or more program storage areas for storing a software, wherein the new software is stored in the program storage area where the current software is not stored; and a history information generation and management unit which generates history information of the current software, based on revision information of the current software and option information indicating whether or not various functions installed in the field device are effective, and then stores the history information in a history information storage area included in the storage section, when the new software is downloaded from the host system.

According to one or more aspects of the present invention, there is provided a field device software update system. The field device software update system comprises: the above-mentioned field device; and a host system connected to the field device through the field bus and comprising a software download unit from which the new software is downloaded into the field device.

BRIEF DESCRIPTION OF THE DRAWINGS

In the accompanying drawings:

FIGS. 5A to 5D are schematic representations of the software download operation of the field device in various situations;

FIGS. 6A to 6C are schematic representations to describe various parameters and the operation thereof.

DETAILED DESCRIPTION OF EXEMPLARY EMBODIMENTS

Exemplary embodiments of the present invention will be now described with reference to the drawings.

Figure 1:
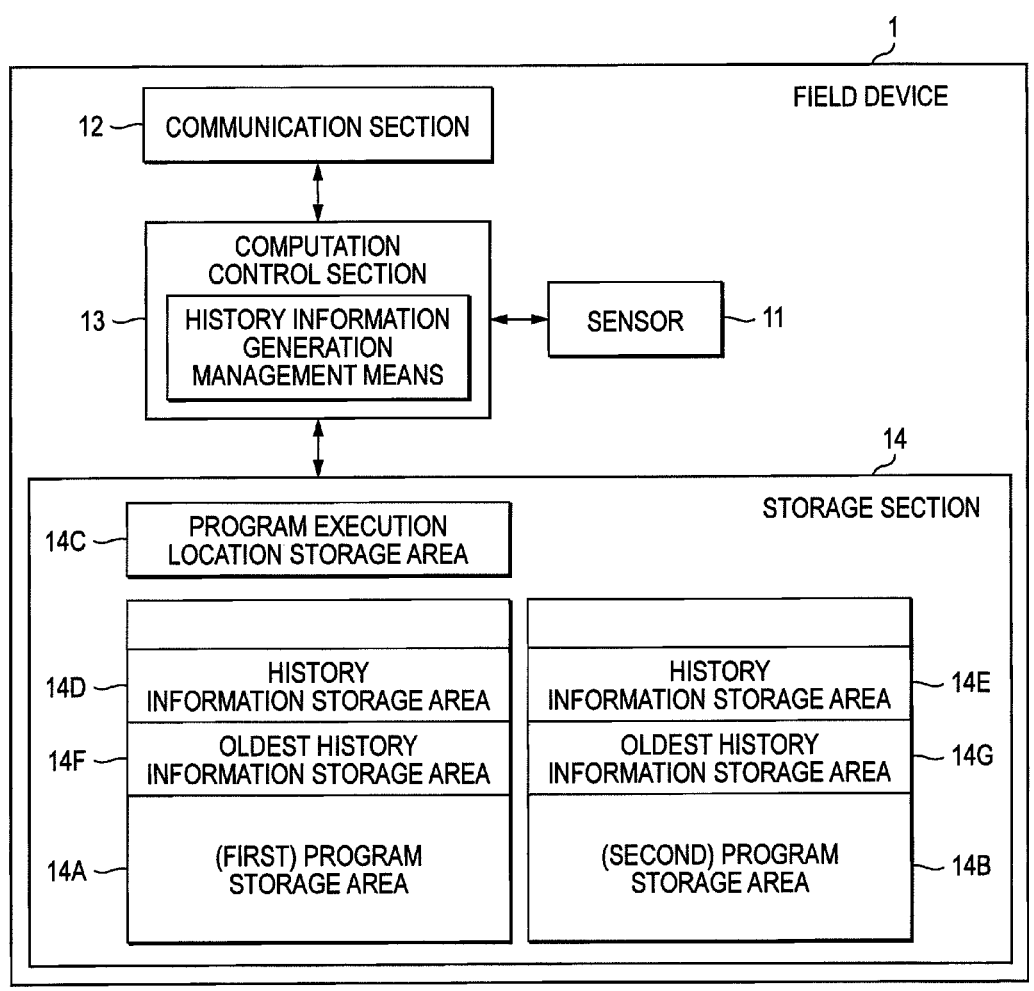
FIG. 1 is a block diagram to show a field device according to an exemplary embodiment of the present invention.
Figure 7:
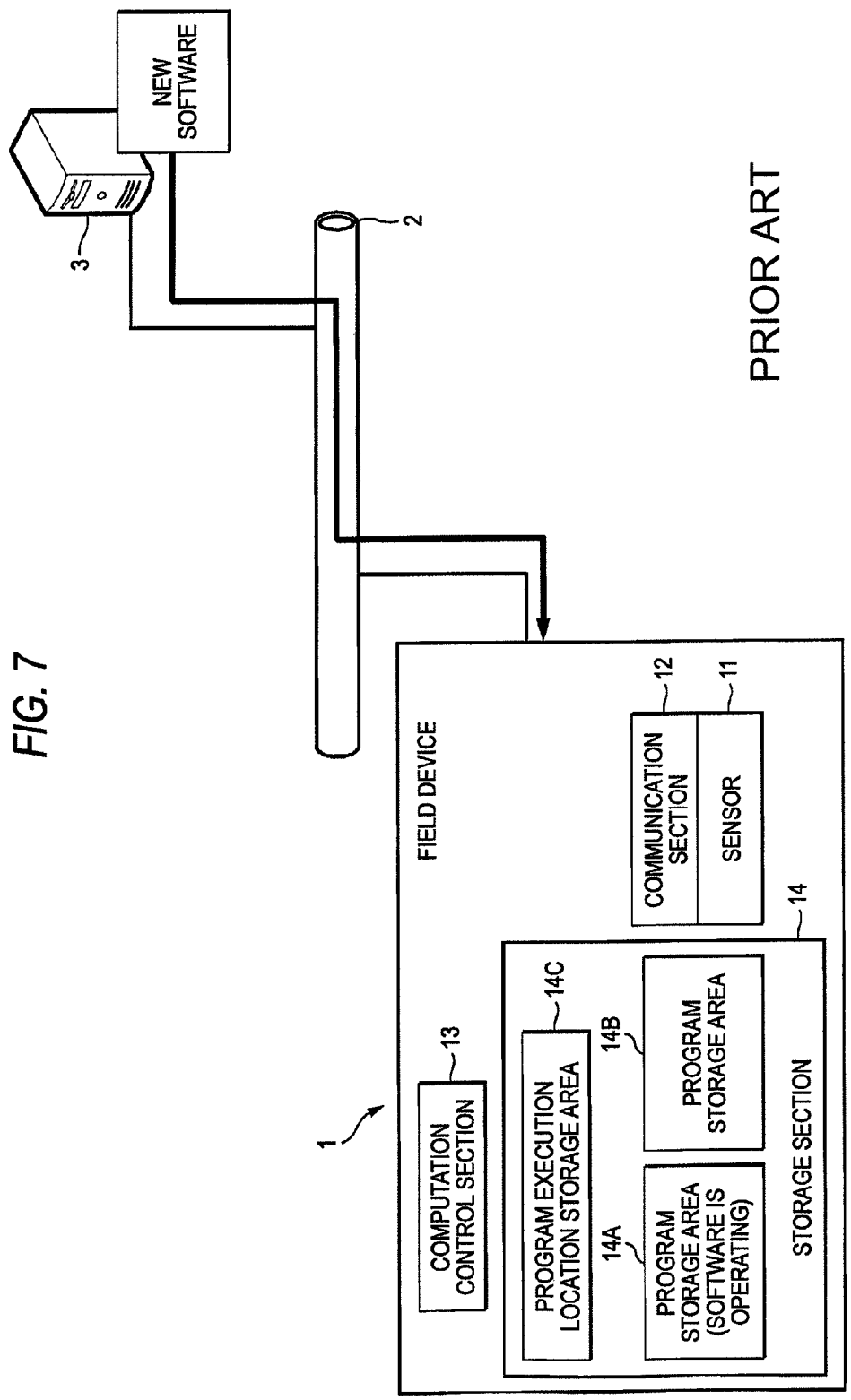
FIG. 7 is a block diagram to show a configuration example of a field device and a process control system using the field device in a related art.

FIG. 1 is a block diagram to show a field device according to an exemplary embodiment of the present invention. Components common to those previously described with FIG. 7 are denoted by the same reference numerals and will not be discussed again. The field device in FIG. 1 differs from the field device in FIG. 7 in that a computation control section 13 creates history information of software or firmware and revision information is stored and managed in a storage section 14.

In FIG. 1, a field device 1 is made up of a sensor 11 for measuring a process amount, a communication section 12 of an FF communication interface for conducting data communications with a different field device or any other apparatus through a field bus 2, and a computation control section 13 such a CPU. The computation control section 13 controls execution of the communication function of transmitting data and function blocks proper to the field device such as AI (analog communication input), AO (analog signal input/output), and PID computation (proportion, integration, differential computation), execution of replacement of software or firmware, and the functions and means of history information generation and management means for generating history information concerning software and storing and managing the history information, etc.

The field device 1 also includes a storage section 14. The storage section 14 may be a nonvolatile memory such as EPROM, flash ROM, EEPROM for retaining software or firmware, a program of a computation portion for converting a measurement signal from the sensor into an output signal, and configuration information forming network information. Also, the storage section 14 may be a RAM, a hard disk or the like.

The storage section 14 of the field device 1 has program storage areas 14A and 14B for storing the current software being executed or software before and after replacement and a program execution location storage area 14C for storing execution program information for specifying the storage area of software to be executed (program storage area 14A or 14B).

The program storage areas 14A and 14B have history information storage areas 14D and 14E, respectively, for storing software download history information. The program storage areas 14A and 14B have oldest history information storage areas 14F and 14G, respectively, for storing the oldest software download history information.

Figure 2:
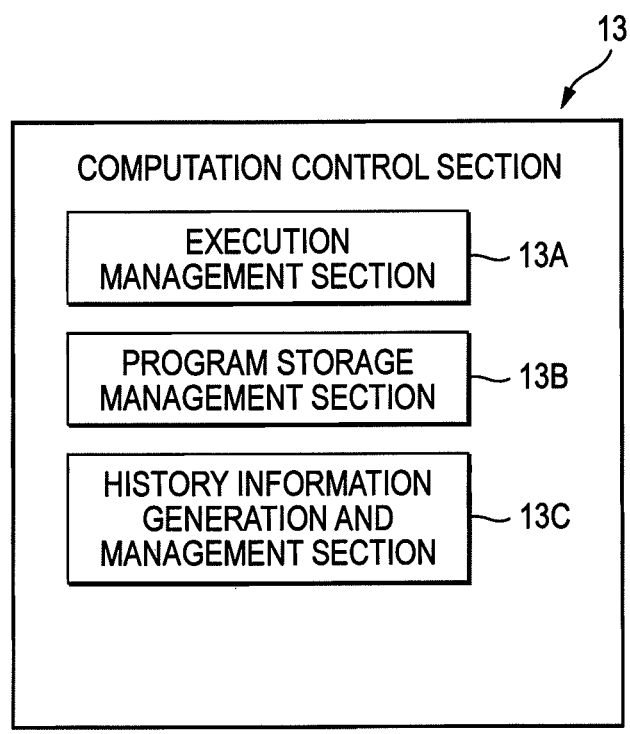
FIG. 2 is a function block diagram of a computation control section 13 in FIG. 1.

FIG. 2 is a function block diagram of the computation control section 13 shown in FIG. 1. In FIG. 2, the computation control section 13 has an execution management section 13A for executing the software stored in the program storage area 14A or 14B specified in the execution program information based on the execution program information in the program execution location storage area 14C. Also, the computation control section 13 has a program storage management section 13B for retaining the data of received new software.

The program storage management section 13B retains the data of received new software in the program storage area 14A or 14B where software not operating at present is stored.

The computation control section 13 of the field device 1 also has a history information generation and management section 13C as the above-mentioned history information generation and management means. The history information generation and management section 13C generates software download history information based on various pieces of information of the currently operating software when new software is retained, additionally stores the history information in the history information storage area 14D or 14E, and stores the generated history information in the oldest history information storage area 14F or 14G as the oldest history information if the first software download is executed.

Figure 3:
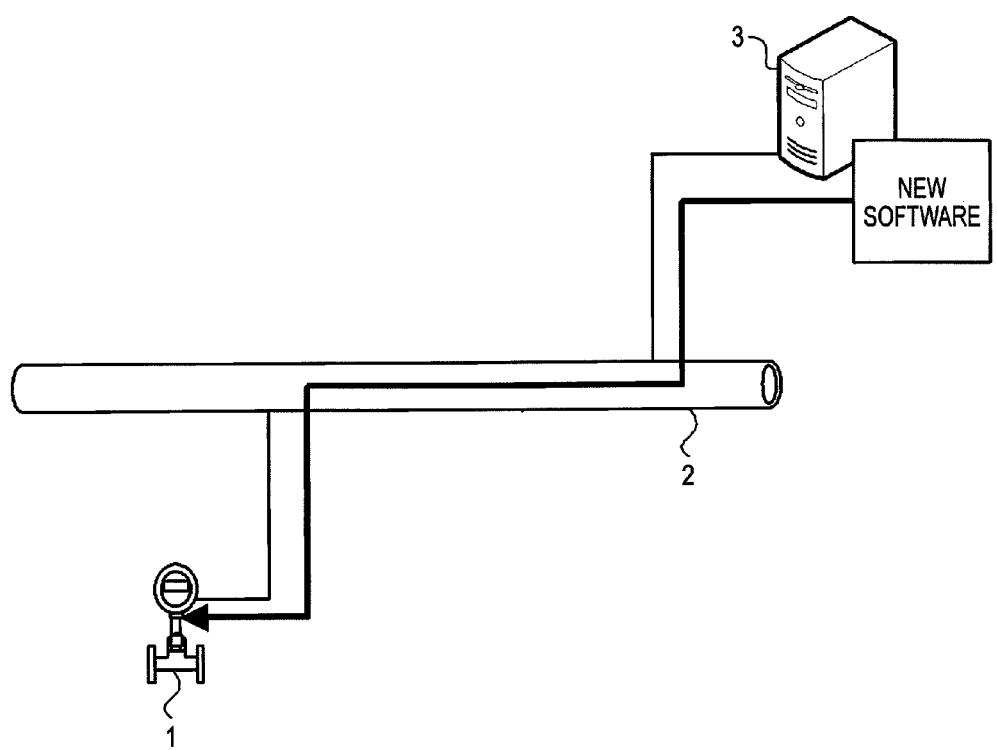
FIG. 3 is a block diagram of a field device software update system using the field device 1 shown in FIG. 1.

FIG. 3 is a block diagram of a field device software update system using the field device 1 shown in FIG. 1.

Replacement of new software to upgrade the function of the software of the field device 1 or solve a problem is classified into Class 1 (the field device 1 normally operates even during updating), Class 2 (the field device 1 stops computation or the like although it takes part in the bus), and Class 3 (the field device 1 only takes part in the bus) in response to the operation of the field device 1. FIG. 3 illustrates the configuration of a field device software update system at the software downloading time according to Class 1 which is most difficult to realize.

In FIG. 3, a field device software update system 100 is made up of the field bus 2 of a network for transferring a signal between the field device 1 and another field device using digital communications, and a host 3.

The host 3 is a host system of DCS, including input means, display means, storage means, and software download means for transferring or downloading software to a field device (not shown).

The field device 1 is connected to the field bus 2. Any other field device (not shown) is connected to the field bus 2 and the host 3 is connected to the field bus 2 through an I/O unit and a bus (not shown).

Figure 4:
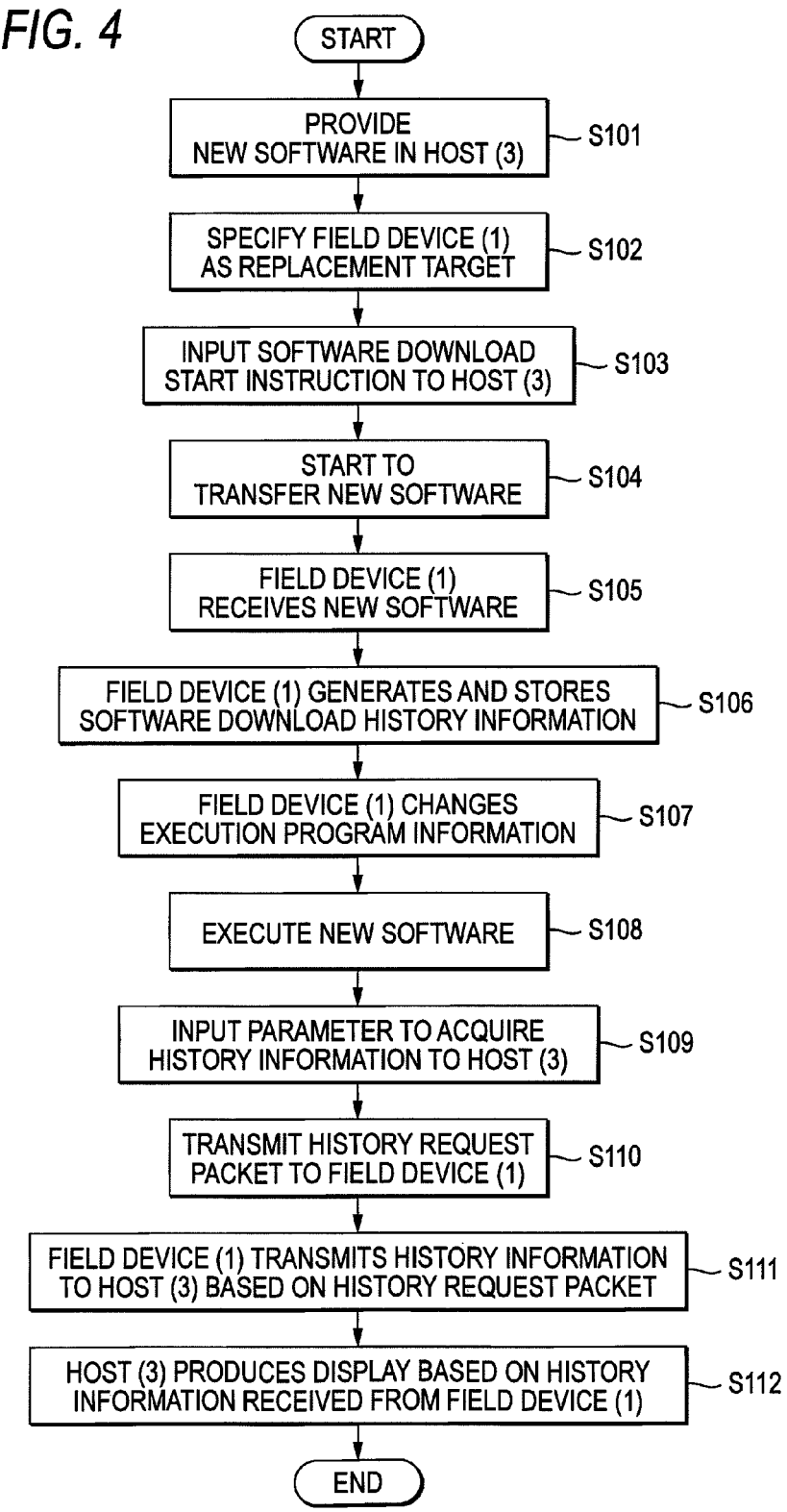
FIG. 4 is an operation flowchart of the field device 1 of FIG. 1 and the host 3 of FIG. 3.

FIG. 4 is an operation flowchart of the field device 1 shown in FIG. 1 and the host 3 shown in FIG. 3. It is assumed that the execution management section 13A of the field device 1 uses at present the software stored in the program storage area 14A.

At step S101, the user who will download software provides new software in the host 3 (DCS or like). Specifically, the new software is read into the host 3 through a storage medium reader (not shown), etc., and is temporarily stored in the host 3.

At step S102, the host 3 receives, through the input means (not shown), a specification signal specifying the field device 1 as the replacement target of software, which is entered by the user.

At step S103, the host 3 receives, through the input means (not shown), a software download start instruction signal, which is entered by the user.

At step S104, the host 3 starts to transfer the new software in accordance with a protocol of FOUNDATION Fieldbus communications (hereinafter, referred to as "FF communications") based on the start instruction input through the input means. In other words, the software download means of the host 3 starts to download the software based on the start instruction.

At step S105, the field device 1 as the replacement target receives the data of the new software in sequence through the field bus 2 in accordance with the FF communication protocol.

At step S106, the program storage management section 13B of the field device 1 retains the received data of the new software in the program storage area 14B where software not operating at present is stored.

When the new software is retained, the history information generation and management section 13C of the field device 1 generates software download history information based on revision information and option information of the currently operating software stored in the storage section 14, and additionally stores the software download history information in the history information storage area 14E.

The revision information indicates the revision number representing minor change or correction of the currently operating software and is opened to the user. For example, the revision information may be represented as "R3.01," "R3.02," or the like. The option information indicates whether or not the functions installed in the field device 1 (function blocks of PID, AI, AO, etc.,) are effective. For example, the option information may be represented as "E000," "E001," or the like. The revision information is described in software stored in the program storage area and the option information is stored in the storage section 14.

Specifically, the history information generation and management section 13C generates software download history information such as "E000/3.02", based on the option information such as "E000" and the revision information such as "3.02", and stores the software download history information in the history information storage area 14E in the program storage area 14B.

The history information generation and management section 13C stores the software download history information in the oldest history information storage area 14G in the program storage area 14B as the oldest information only at the first software downloading time.

At step S107, upon completion of reception of the new software, the execution management section 13A of the computation control section 13 of the field device 1 changes the execution program information in the program execution location storage area 14C so as to execute the software stored in the program storage area 14B of the newly received program.

At step S108, the execution management section 13A of the field device 1 executes the new software by restarting the software, for example, after update completion of the execution program information in the program execution location storage area 14C.

To display the history information on display means (not shown) of the host 3, the field device 1 and the host 3 perform operation of steps S109 to S112 as follows:

At step S109, a parameter of SOFTTDL_HIST_DATA, for example, to acquire history information from the field device 1 is input to the host 3 through the input means (not shown) of the host 3.

At step S110, based on the input parameter, the host 3 transmits an FF communication protocol packet where the parameter is set (hereinafter, referred to as "history request packet") to the field device 1.

At step S111, the history information generation and management section 13C of the field device 1 transmits history information to the host 3 through the communication section 12 based on the history request packet received through the field bus 2 from the host 3.

At step S112, based on the history information received from the field device 1, the host 3 displays the history information on the display means (not shown).

Consequently, in the field device and the field device software update system using the field device, it is possible to grasp the history information of the software which previously operated by creating the history information in replacing the software and storing the history information in each of the history information storage areas provided in the program storage areas.

According to the exemplary embodiments, the history information is created in replacing the software and is retained in the storage section, and also the history information of the software which previously operated can be grasped and be displayed. Accordingly, if a defect occurs in the operation of the field device, it becomes easy to again download the previous revision software which stably operated and restore to the stable operation.

According to the exemplary embodiments, the history information is created in replacing the software and is retained in the storage section, and also the history information of the software which previously operated can be grasped and be displayed. Accordingly, the circumstances and the progress of plural software products installed so far can be grasped and it is made possible to investigate the defects of the software which occurred in the past.

According to the exemplary embodiments, the history information is created in replacing the software and is retained in the storage section, and also the history information of the software which previously operated can be grasped and displayed. Accordingly, even if a defect occurs, it becomes easy to restore the operation of the field device to the operation of the previous revision software. Further, the maintenance time of the software is shortened, and the adverse effect on the whole process control system can be decreased as compared with that on the related-art system.

In the field device and the field device software update system using the field device, the history information is stored at step S106 as described above, but the storage method may vary depending on the state of the field device. FIGS. 5A to 5D are schematic representations of the software download operation of the field device in various situations.

FIG. 5A is a schematic representation of the software download operation when the field device does not have the history management function; FIG. 5B is a schematic representation of the first download operation when the field device has the history management function; FIG. 5C is a schematic representation of the second or later download operation when the field device has the history management function; and FIG. 5D is a schematic representation of the download operation when field device history information is stored and the number of the stored history information exceeds the maximum number.

In FIG. 5A, when software is operating in the field device 1 having no history management function and new software is downloaded from the host 3, the field device 1 stores the new downloaded software (R3.02) in the program storage area 14B, but cannot generate history information for storage.

In FIG. 5B, when the field device 1 has the history management function and new software is first downloaded from the host 3, the history information generation and management section 13C creates software download history information (E000/3.02) based on the revision information (3.02) and the option information (E000) of the operating software and then stores the software download history information in the history information storage area 14E in the program storage area 14B where the new received software is stored. If the software is downloaded for the first time, the history information generation and management section 13C also stores the generated software download history information in the oldest history information storage area 14G as the oldest history information.

In FIG. 5C, when the field device 1 has the history management function and new software is downloaded at the second time (or the later time) from the host 3, the history information generation and management section 13C of the field device 1 creates software download history information (E000/3.03) based on the revision information and the option information of the operating software and the currently retained history information, and then stores the software download history information in the history information storage area 14E of the program storage area 14B where the new received software is stored.

If new software is downloaded at the second time (or the later time), the field device 1 copies the history information (for example, E000/3.02) stored in the history information storage area 14D in the program storage area 14A where the currently operating software is stored in replacing the software, and retains the copied history information in the history information storage area 14E in the program storage area 14B.

In FIG. 5D, if the number of the history information created upon downloading the software reaches the maximum number of the history information in the history information storage area 14D or 14E in the program storage area 14A or 14B where the downloaded software is stored, the history information generation and management section 13C deletes the oldest data (E000/3.02) among the data stored in the history information storage area 14D or 14E at present, creates software download history information based on the revision information and the option information of the currently operating software, and then stores the software download history information in the history information storage area 14D or 14E in the storage area of the new software received upon downloading the software. The maximum number of information to be stored may be set in advance and stored in the storage section 12.

Thus, according to the exemplary embodiments, each of the program storage areas has a history information storage area for retaining the history information, and whenever software is downloaded and replaced, the history information stored in the history information storage area of the program storage area where the currently operating software is stored is copies into and stored in the history information storage area of the program storage area where the new software is to be stored, whereby the history information of the software which previously operated can be all grasped in the program storage areas.

According to the exemplary embodiments, the history information is retained in the history information storage area in response to the update order, whereby the history information of the software which previously operated can be grasped.

According to the exemplary embodiments, the history information is created in replacing the software and is retained in the storage section. Also, the oldest history information is stored in the oldest history information storage area. Thus, if the number of the history information in the history information storage area exceeds the maximum number of information, the oldest history information is not deleted and is retained. Accordingly, the initial history information at the start time of history information management can be grasped, so that it becomes easy to again download the revision software at the time and restore to the operation at the time.

Figure 6C:
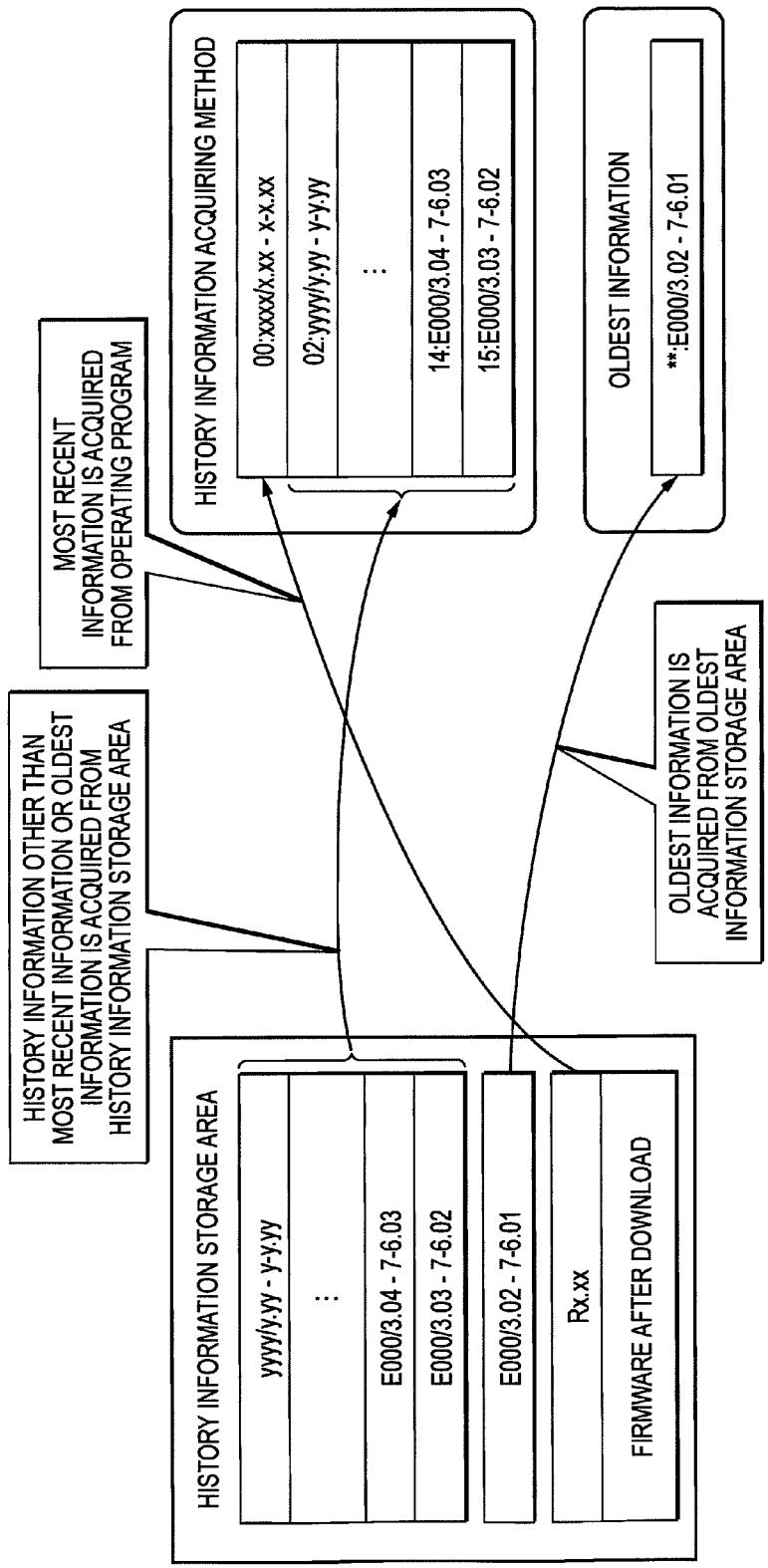

Inn the field device software update system according to the exemplary embodiments, the host 3 may be a host capable of acquiring history information from the field device 1 by specifying various parameters in the FF communication protocol. FIGS. 6A to 6C are schematic representations to describe various parameters and the operation thereof. FIG. 6A shows an example of a parameter to acquire the oldest history information. FIG. 6B shows an example of a parameter to acquire the software download history information. FIG. 6C is a schematic representation of the operation of acquiring each history information.

To acquire the oldest history information, the user selects the field device 1 as the target for acquiring the oldest history information therefrom through the input means (not shown) of the host 3, and enters a parameter "SOFTDL_HIST_FIRST_VERSION" as shown in FIG. 6A. This parameter "SOFTDL_HIST_FIRST_VERSION" is a parameter to acquire the oldest history information of the version of the software installed at the shipment time of the field device.

To specify the parameter (SOFTDL_HIST_FIRST_VERSION) to acquire the oldest history information for the field device 1, the host 3 sets the parameter in a packet of the FF communication protocol and transmits the packet to the field device 1.

Upon reception of the packet specifying the parameter to acquire the oldest history information such as "SOFTDL_HIST_FIRST_VERSION" from the host 3, the field device 1 provides the history information stored in the oldest history information storage area 14G of the field device 1 in a reply packet as parameter information and returns the reply packet.

The host 3 acquires the oldest history information (e.g., E00/3.02-7-6.01) based on the reply packet received from the field device 1 as shown in FIG. 6C, and displays the oldest history information on the display means (not shown).

On the other hand, to acquire the history information, the user selects the field device 1 as the target for acquiring the history information therefrom through the input means (not shown) of the host 3, and then enters a parameter "SOFTDL_HIST_DATA" as shown in FIG. 6B. This parameter "SOFTDL_HIST_DATA" is a parameter to acquire software download history information.

To specify the parameter "SOFTDL_HIST_DATA" to acquire the software download history information for the field device 1, the host 3 sets the parameter in a packet of the FF communication protocol and transmits the packet to the field device 1.

Upon reception of the packet specifying the parameter to acquire the history information such as "SOFTDL_HIST_DATA" from the host 3, the field device 1 provides the history information stored in the history information storage area 14D or 14E of the field device 1 in a reply packet as parameter information and then returns the reply packet.

The host 3 acquires the history information based on the reply packet received from the field device 1 as shown in FIG. 6C and displays the history information (e.g., E0013.03-7-6.02, E00/3.04-7-6.03, . . . , xxxx/xxx-x-xxx) on the display means (not shown).

Thus, according to the exemplary embodiments, the field device creates history information and stores the history information in the storage section in replacing the software and also the host inputs various parameters and acquires the history information from the field device using FF communications and displays the history information, whereby the history information of the software which previously operated can be grasped. According to the exemplary embodiments, the host inputs various parameters using FF communications and can display the history information from the most recent history information to the oldest history information as desired, whereby the history information of the software which previously operated can be grasped.

In the field device according to the exemplary embodiments, the history information is created based on the revision information and the option information of the field device, and then the history information is stored. However, it may be a field device which creates software download history information based on "date information" indicating the date and time of execution of software download and "component revision information (Device Revision)" of the revision number of function upgrade for each of the components such as an LCD and a sensor, and then stores the software download history information. The field device may be a field device for storing the "date information" and the "component revision information" in the history information storage area in association with the software download history information created at step S106.

The above-described field device may be a field device for acquiring data of software from a website through the Internet.

As described above, the history information can be created and stored in the storage section in replacing the software and the history information of the software which previously operated can be grasped. Thus, the present invention can contribute to improvement of the process in a process control system of industrial automation, and can also contribute to optimum running and control of the target to be controlled according to a field control loop.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A field device for downloading a new software through a field bus from a host system and replacing a current software which is currently executed with the new software, the field device comprising:
a non-transitory storage section including two or more program storage areas for storing a software, wherein the new software is stored in a program storage area where the current software is not stored; and
a history information generation and management section which generates and stores history information of the current software when the new software is downloaded from the host system,
wherein the storage section further includes history information storage areas for storing the history information in the two or more program storage areas,
wherein the two or more program storage areas include: a first program storage area where the current software is stored; and a second program storage area where the new software is to be stored,
wherein the history information storage areas include: a first history information storage area for storing the history information in the first program storage area; and a second history information storage area for storing the history information in the second program storage area, and
wherein when the new software is downloaded, the history information generation and management section copies the history information stored in the first history information storage area into the second history information storage area.

2. A field device for downloading a new software through a field bus from a host system and replacing a current software which is currently executed with the new software, the field device comprising:
a non-transitory storage section including two or more program storage areas for storing a software, wherein the new software is stored in a program storage area where the current software is not stored; and
a history information generation and management unit which generates history information of the current software, based on revision information of the current software and option information indicating whether or not various functions installed in the field device are effective, and then stores the history information in a history information storage area included in the storage section, when the new software is downloaded from the host system,
wherein the storage section further includes history information storage areas for storing the history information in the two or more program storage areas,
wherein the two or more program storage areas include: a first program storage area where the current software is stored; and a second program storage area where the new software is to be stored,
wherein the history information storage areas include: a first history information storage area for storing the history information in the first program storage area; and a second history information storage area for storing the history information in the second program storage area, and
wherein when the new software is downloaded, the history information generation and management unit copies the history information stored in the first history information storage area into the second history information storage area.

3. The field device according to claim 2, wherein the field device conforms to a FOUNDATION Fieldbus standard.

4. The field device according to claim 2,
wherein the storage section further includes an oldest history information storage area for storing an oldest history information in the two or more program storage areas, and
wherein when the new software is downloaded for the first time, the history information generation and management unit stores the generated history information in the oldest history information storage area as the oldest history information.

5. The field device according to claim 4, wherein the history information generation and management unit transmits the history information or the oldest history information to the host system, based on a packet containing a parameter for acquiring the history information.

6. A field device software update system comprising:

the field device according to claim 1; and a host system connected to the field device through the field bus and comprising a software download unit from which the new software is downloaded into the field device.

7. A field device software update system comprising:

the field device according to claim 4; and a host system connected to the field device through the field bus and comprising a software download unit from which the new software is downloaded into the field device.

8. The field device software update system according to claim 7, wherein the host system further comprises a display unit which displays the history information or the oldest history information.

9. The field device software update system according to claim 1, wherein the history information includes a plurality of revision information as related to the current software and the new software, as updated versions of the new software are downloaded from the host system.

10. The field device software update system according to claim 9, wherein the history information generation and management unit operably holds a predetermined amount of revision information, and when the predetermined amount is exceeded based on download of data from the host system, said history information generation and management unit deletes oldest history information.

11. The field device software update system according to claim 9, wherein the history information generation and management unit operably transmits history information including information for an old version of software of the current software to the host system upon receipt of a packet request from the host system.

* * * * *